United States Patent [19]

Gillespie

[11] 4,123,037

[45] Oct. 31, 1978

[54] VALVES

[75] Inventor: Peter J. Gillespie, Basingstoke, England

[73] Assignee: Bridon Engineering Limited, Sheffield, England

[21] Appl. No.: 774,614

[22] Filed: Mar. 4, 1977

[30] Foreign Application Priority Data

Mar. 9, 1976 [GB] United Kingdom ............... 9275/76

[51] Int. Cl.² ........................................... F16K 27/04
[52] U.S. Cl. .................................. 251/367; 137/271;
137/625.48; 137/625.69
[58] Field of Search ............ 137/625.69, 271, 625.48,
137/625.25, 533.19, 543.19; 251/367, DIG. 1

[56] References Cited

U.S. PATENT DOCUMENTS

| 1,016,167 | 1/1912 | McCulloch | 137/625.69 |
| 2,910,091 | 10/1959 | Weis | 137/625.48 |
| 3,036,594 | 5/1962 | Salisbury | 137/533.19 |
| 3,354,912 | 11/1967 | Gordon et al. | 137/625.69 |
| 3,418,002 | 12/1968 | Hennells | 137/625.69 |
| 3,451,430 | 6/1969 | Cowdin | 137/625.69 |
| 3,516,442 | 6/1970 | Munroe | 251/367 |
| 3,680,596 | 8/1972 | Pickett | 137/625.69 |
| 3,952,996 | 4/1976 | Hart | 137/625.69 |
| 3,960,166 | 6/1976 | Linser | 137/625.69 |
| 3,989,058 | 11/1976 | Jackson et al. | 251/367 |

FOREIGN PATENT DOCUMENTS

| 495,754 | 9/1950 | Belgium | 137/533.19 |
| 859,658 | 5/1939 | France | 137/543.19 |
| 1,292,282 | 3/1961 | France | 137/625.69 |

Primary Examiner—William R. Cline
Assistant Examiner—H. Jay Spiegel
Attorney, Agent, or Firm—Morgan, Finnegan, Pine, Foley & Lee

[57] ABSTRACT

A valve housing member and a valve including a number of juxtaposed housing members containing a ported sleeve with a reciprocally mounted valve member therein. Each housing member comprises a generally cup-shaped portion which is centrally apertured to accommodate a valve sleeve with a clearance therebetween. A number of relatively flexible leg members are spaced about and extend axially from the aperture within the cup-shaped portion. A mounting ring is carried on the free ends of the leg members and arranged to surround and support the valve sleeve.

7 Claims, 3 Drawing Figures

VALVES

The invention relates to valves and more particularly to spool and sleeve valves, and housings therefor, for directing fluid to control apparatus such as cylinders for machine tool operation and other industrial applications.

According to one aspect of the invention there is provided a valve housing member comprising a generally cup-shaped portion which is centrally apertured to accommodate a valve sleeve therethrough with a clearance therebetween, in use, a plurality of relatively flexible leg members spaced about and extending axially from said aperture and within said cup-shaped portion and a mounting ring carried on the free ends of said leg members arranged to surround and support the valve sleeve, in use.

According to a further aspect of the invention there is provided a valve comprising a valve housing containing a ported sleeve and a moveable valve member reciprocably mounted in the sleeve, the valve housing comprising a plurality of juxtaposed tubular housing members, each such member comprising a generally cup-shaped portion which is centrally apertured to accommodate the sleeve therethrough with a clearance therebetween, a plurality of relatively flexible leg members spaced about and extending axially from said aperture within said cup-shaped portion and a mounting ring carried on the free ends of said leg members arranged to surround and support the sleeve, seal means being located around said aperture and around the axially extending outer edge of the cup-shaped portion between each adjacent ones of said tubular members.

Preferably said housing member or members is/are moulded of synthetic plastics material.

The or each aperture in said cup-shaped portion may be formed with an annular groove or step thereabout, on its side remote from said legs to accommodate a ring seal at least partially therein.

Annular grooves, which may be of V-shaped cross-section, may be formed on the opposed axially outer surfaces of the cup-shaped portion, such grooves being radially in alignment so as to accommodate a ring seal in aligned pairs of said grooves in adjacent housing members, in use.

End cap members may be provided which may also be moulded of synthetic plastics material and may also be formed with annular grooves therein on their axially inner surface, which are radially in alignment with the grooves formed in the housing members.

Each of the housing members may be formed with a radially extending port, a plate member may be located to span at least some of the housing members with apertures formed therein leading to a slot formed in the plate and a further apertured and slotted plate being located in said slot to align with said ports so as to interconnect selected ones of said ports.

The foregoing and further features of the invention may be more readily understood from the following description of a preferred embodiment thereof, by way of example, with reference to the accompanying drawings, in which.

Figure 1:
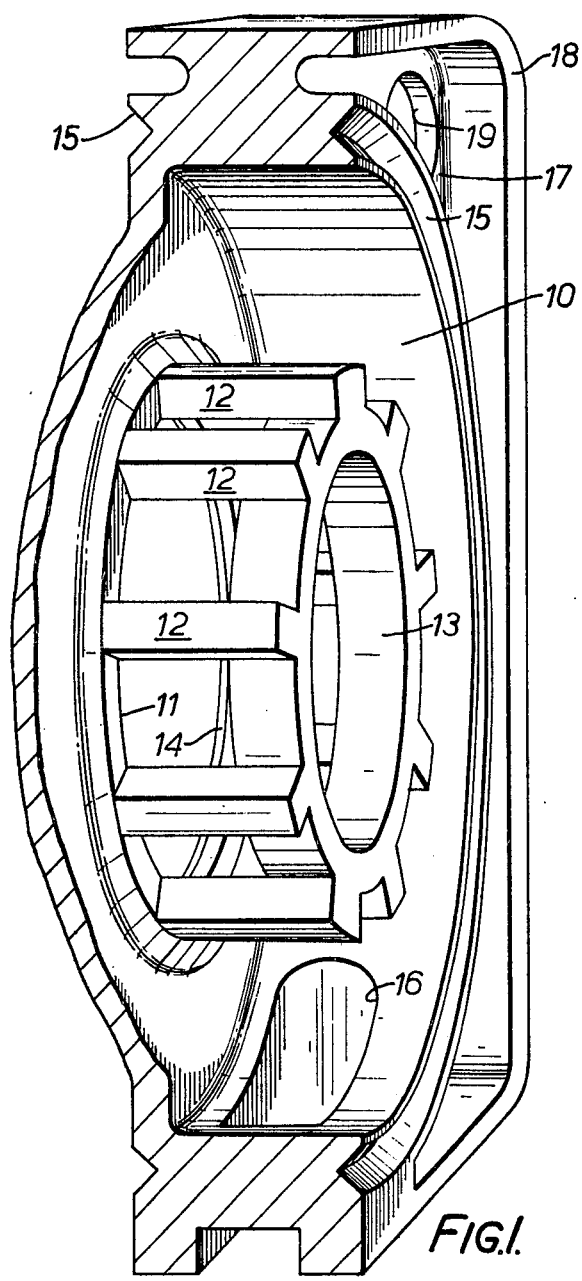
FIG. 1 is a perspective view, part cut away, of a housing member for a valve.

Referring now firstly to FIG. 1 there is shown a valve housing member moulded of a synthetic plastics material. The member comprises a generally cup-shaped portion 10 formed with a central aperture 11. Radially spaced leg members 12 extend axially from around aperture 11 within cup-shaped portion 10 and carry a mounting ring 13 within and adjacent their free ends. The aperture 11 is formed with a stepped portion 14 on its side remote from legs 12.

Radially aligned grooves 15 are formed in the axially outer sides of the housing member surrounding the cup-shaped portion 10 and each have a V-shaped transverse section. An inlet/outlet port 16 is formed radially extending into the cup-shaped portion 10.

A web portion 17 extends from around the outer periphery of portion 10 to an outer axially extending peripheral rib 18 which is formed to give the housing member a square shape when viewed horizontally from one side. Apertures 19 are formed in the web portion 17 adjacent the corners of rib 18 to enable a number of juxtaposed housing members to be clamped together, in use.

Figures 2, 3:
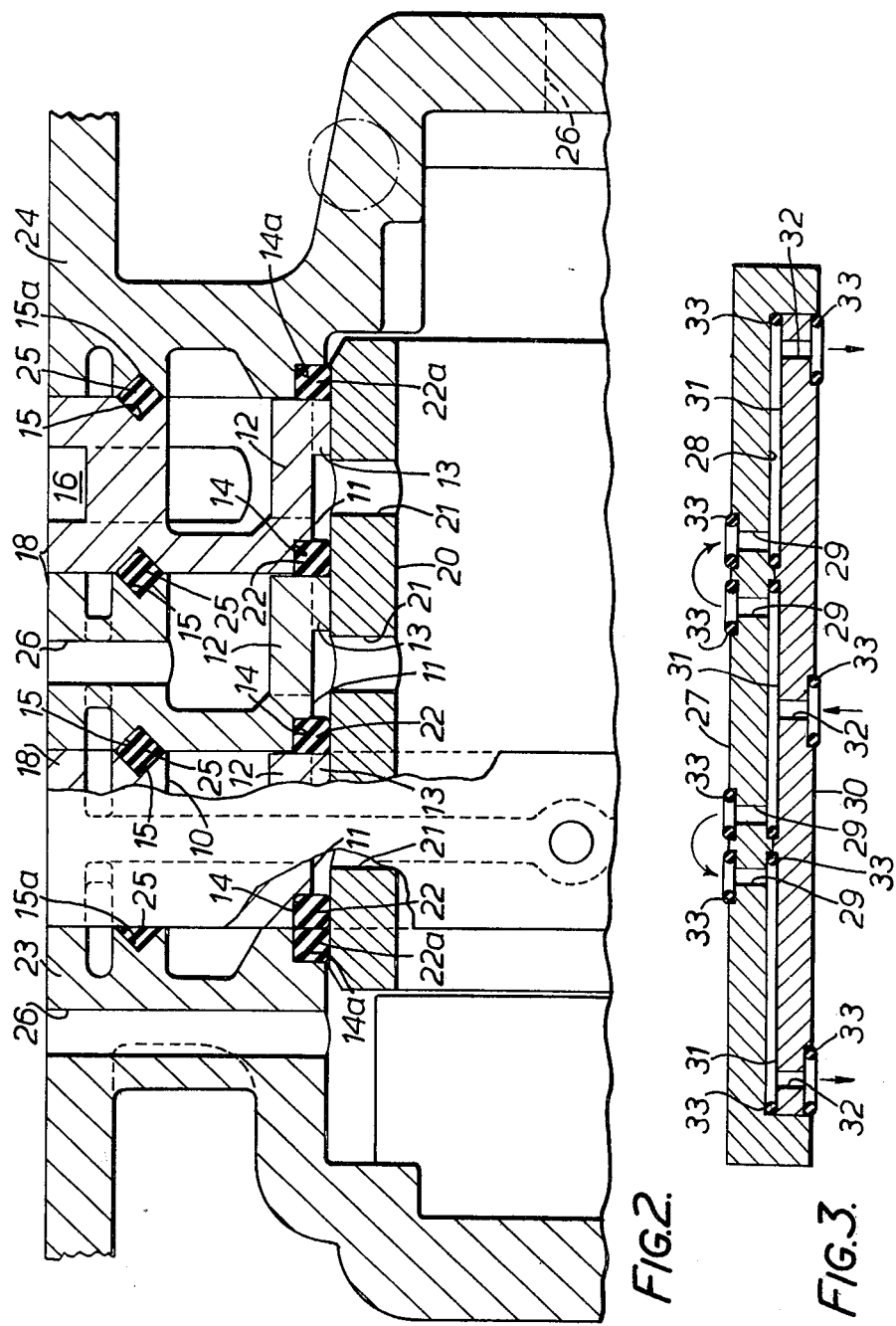
FIG. 2 is a side sectional view through half a valve including three housing members of FIG. 1 in different radial orientations.
FIG. 3 is a side sectional view through a pair of plate members for use in interconnecting ports of the housing members of a valve of FIG. 2.

Referring now to FIG. 2 there is shown a valve sleeve 20 formed with ports 21 housed within three housing members as shown in FIG. 1 and with respective end caps 23 and 24. A valve member (not shown) formed with lands thereon would be slidably located in sleeve 20 to selectively interconnect and open and close ports 21.

The sleeve 20 is located in the housing by being mounted within the mounting rings 13, the resilient legs 12 ensuring that any axial loads on the outer portion of the housing or any thermal distortions are not transmitted to the sleeve 20.

The various housing members are sealed one from the other and from the sleeve 20 by ring seals to provide a separate chamber within each housing member. A ring seal 22 is located in each stepped portion 14 and abuts against the surface of the ring 13 and the ends of legs of the adjacent housing member. Similarly a ring seal 22a is located in a stepped portion 14a of end cap 24. End cap 23 also has a stepped portion 14a with a ring seal 22a which abuts ring seal 22 of the adjacent housing member. In this way the end caps 23 and 24 can both be formed identical with a single moulding.

Ring seals 25 are located in adjacent grooves 15 of adjacent housing members and in similarly radially aligned grooves 15a in end caps 23 and 24.

Hence with the housing members and end caps a housing of any required type to accommodate any length or action of spool and sleeve valve can be provided with merely the two different mouldings. The housing members and end caps can be varied by drilling, for example at 26, as required, to give pilot operations or other ancillary features, such as solenoid operation.

Referring now to FIG. 3 there is shown an arrangement, suitable for use with a valve housing of FIG. 2 to provide interconnections between the ports of the housing members, end caps and pilot valves. The arrangement comprises a main plate 27 formed with a longitudinally extending slot 28 in its lower surface and apertures 29 in its upper surface above slot 28. A further plate 30 is located in slot 28 and is formed with cut-away portions 31 and apertures 32. Various ring seals 33 are so located as to provide a path for fluid flow to one or the other end cap from the centre to provide pilot operation of the valve. By varying the apertures and slots in the plates 27 and 30 other required interconnections can be provided without the need for conduit connectors between the various ports. Plates 27 and 30 are also preferably moulded from synthetic plastics material.

The ring seals 25 may be replaced by seal and groove formations integrally formed in the housing members.

What is claimed is:

1. A valve comprising a valve housing containing a ported sleeve, the valve housing comprising a plurality of juxtaposed tubular housing members, each such member comprising a generally cup-shaped portion which is centrally apertured to accommodate the sleeve therethrough with a clearance therebetween, a plurality of relatively flexible leg members spaced about and extending axially from said aperture within said cup-shaped portion and a mounting ring carried on the free ends of said leg members arranged to surround and support the sleeve, seal means being located around said aperture and around the axially extending outer edge of the cup-shaped portion between each adjacent ones of said tubular members.

2. A valve as claimed in claim 1 wherein each tubular housing member is moulded of synthetic plastics material.

3. A valve as claimed in claim 1 wherein the cup-shaped portion of each tubular housing member is formed with an annular step thereabout, on the side remote from said legs, and an annular ring seal is at least partially accommodated therein.

4. A valve as claimed in claim 1 wherein each tubular housing member has annular grooves formed on the opposed axially outer surfaces of the cup-shaped portion, such grooves being radially in alignment so as to accommodate a ring seal in aligned pairs of said grooves in adjacent housing members, in use.

5. A valve as claimed in claim 4 including end cap members each formed with an annular groove therein on an axially inner surface, which is radially in alignment with the grooves of the axially outer surfaces of the housing members, and a ring seal located therein.

6. A valve as claimed in claim 4 wherein each end cap member is moulded of synthetic plastics material.

7. A valve as claimed in claim 1 wherein each of the housing members is formed with a radially extending port and a plate member is located to span at least some of the housing members with apertures formed therein leading to a slot formed in the plate and a further apertured and slotted plate being located in said slot to align with said ports so as to interconnect selected ones of said ports.

* * * * *